United States Patent [19]
Boyer

[11] Patent Number: 4,722,585
[45] Date of Patent: Feb. 2, 1988

[54] OPTICAL FIBER CONNECTION SUPPORT
[75] Inventor: Jean-Pierre Boyer, Paris, France
[73] Assignee: Mars Alcatel, Paris, France
[21] Appl. No.: 799,994
[22] Filed: Nov. 20, 1985
[30] Foreign Application Priority Data Nov. 20, 1984 [FR] France ................. 84 17655

[51] Int. Cl.⁴ .............................................. G02B 6/36
[52] U.S. Cl. ................. 350/96.20; 350/96.21
[58] Field of Search ............... 350/96.20, 96.21, 96.22, 350/96.23

[56] References Cited
U.S. PATENT DOCUMENTS

| | | | |
|---|---|---|---|
| 4,266,853 | 5/1981 | Hutchins et al. ................ | 350/96.20 |
| 4,332,435 | 6/1982 | Post ................................... | 350/96.20 |
| 4,359,262 | 11/1982 | Dolan ................................ | 350/96.20 |
| 4,373,776 | 2/1983 | Purdy ................................ | 350/96.20 |
| 4,428,645 | 1/1984 | Korbelak et al. ................. | 350/96.20 |
| 4,500,166 | 2/1985 | Kunze ................................ | 350/96.20 |
| 4,518,817 | 5/1985 | Kirby et al. ........................ | 350/96.20 |
| 4,595,255 | 6/1986 | Bhatt et al. ........................ | 350/96.20 |

FOREIGN PATENT DOCUMENTS

| | | | |
|---|---|---|---|
| 1096216 | 2/1981 | Canada ............................ | 350/96.20 |
| 2621823 | 12/1977 | Fed. Rep. of Germany ... | 350/96.20 |
| 2517077 | 5/1983 | France ............................. | 350/96.20 |
| 58-223112 | 12/1983 | Japan ............................... | 350/96.20 |

OTHER PUBLICATIONS

Patent Abstract of Japan, vol. 7, No. 2 (p. 166) (1147) Jan. 7, 1983 and J.P-A-57163211 (07.10.1982).
Patent Abstract of Japan, vol. 7, No. 134 (P-203) (1279) Jun. 11, 1983 and J.P-A-5850508 (25.03.1983).
Patent Abstract of Japan, vol. 4, No. 103 (P-20) (585), Jul. 23, 1985 and J.P.-A-5562414 (10.05.1980).

*Primary Examiner*—John Lee
*Assistant Examiner*—Brian M. Healy
*Attorney, Agent, or Firm*—Sughrue, Mion, Zinn, Macpeak, and Seas

[57] ABSTRACT

The support is constituted by a spool comprising a base (F), and outer wall (1) having openings (4) therethrough, an inner wall (2) having openings (5) therethrough, and at least one cylinder (3). An outer ring (A) between the inner and outer walls serves to store slack lengths of fiber-carrier, and an inner ring (B) between said inner wall and said cylinder(s) serves to store slack lengths of optical fiber together with connection devices (11) for interconnecting the fibers. Lugs are provided on the inner and outer walls and on the cylinder(s) in order to hold the fiber-carriers and the fibers in place while the supports are being manipulated. The cylinders may be provided with rotatable covers, in which case the cylinder lugs are fixed to the covers.

10 Claims, 6 Drawing Figures

OPTICAL FIBER CONNECTION SUPPORT

The present invention concerns interconnecting fibercarriers each carrying a plurality of optical fibers.

BACKGROUND OF THE INVENTION

A cable may include a plurality of fiber-carriers, each of which may carry five or ten optical fibers, for example, and the connections between the fiber-carriers of one cable and the fiber-carriers of another cable are enclosed within a sealed connection box. It is common practice to interconnect two fiber-carriers each having ten optical fibers, for example, or to connect one fiber-carrier having ten fibers to two fiber-carriers having five fibers each, with the individual optical fibers being interconnected by connection devices which are fixed on a support which also serves to store slack lengths of optical fiber, and with the support being enclosed in said connection box which may contain a plurality of such supports. The connection devices which interconnect the optical fibers in pairs may be of the individual type (one device per pair of interconnected fibers) or of the multiple type (one device interconnecting a plurality of pairs of optical fibers)

The cables are fixed to the ends of the connection box, and the fiber-carriers are separated from one another beyond the points where the cables are fixed to the box. The length of each cable-carrier between the end of its cable and the support to which it is itself connected is limited to the length necessary for this purpose and as a result the supports can be withdrawn from the box over a short distance only. The ends of the fiber-carriers are fixed to the corresponding supports, and the optical fibers are separated from one another beyond said points at which the fiber-carriers are fixed to the supports. It is necessary to store a slack length of optical fiber on the support in order to provide access to a work station, such as a splicing bench, for example.

Since the supports are stacked inside the connection box, it is also necessary, in order to obtain access to the optical fibers of a given support, to remove the other supports above said given support.

Furthermore, it is not always possible to place a work station in the immediate proximity of the connection box, e.g. when making connections between buried cables, and it is therefore necessary to store a considerable length of optical fiber in each support in order to enable the fibers to reach the work station.

Preferred embodiments of the present invention overcome the above-mentioned drawbacks of conventional supports, by enabling the supports to be manipulated individually and moved close to a work station, thereby limiting the slack length of optical fiber which need to be stored thereon, while allowing a sufficient slack length to be stored on a support for it to be possible, if necessary, to replace one of the connection devices interconnecting a pair or pairs of optical fibers.

SUMMARY OF THE INVENTION

The present invention provides an optical fiber connection support for connecting optical fibers from at least one fiber-carrier to optical fibers from at least one other fiber-carrier, and in particular for connecting the optical fibers from one fiber-carrier to the optical fibers on one or two other fiber-carriers by means of connection devices, said fiber-carriers each having one end fixed to the support and each constituting a portion of a corresponding cable, said cables each having one end fixed to a connection box which includes a plurality of connection supports for the optical fibers from the fiber-carriers of the cables, each support comprising the improvement whereby it is constituted by a spool comprising a base, an outer wall projecting from said base and provided with openings therethrough, an inner wall projecting from said base inside said outer wall and having openings therethrough, and at least one cylinder, said inner wall together with said outer wall delimiting an outer ring, said inner wall together with said cylinder(s) delimiting an inner ring, said outer ring serving, when said connection support is in place within a connection box, to store slack lengths of said fiber-carriers, and said inner ring serving to store slack lengths of the optical fibers together with said connection devices.

BRIEF DESCRIPTION OF THE DRAWINGS

Embodiments of the invention are described by way of example, with reference to the accompanying drawings, in which.

MORE DETAILED DESCRIPTION

Figure 1:
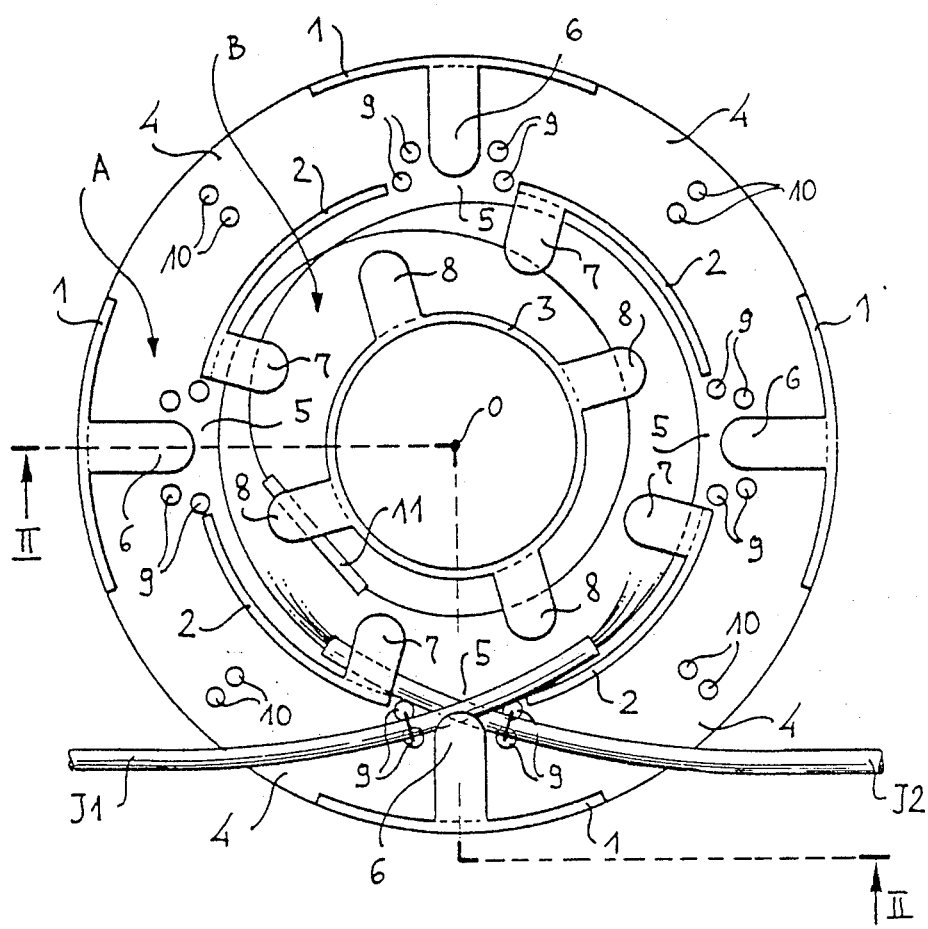
FIG. 1 is a plan view of a support in accordance with the invention.
Figure 2:
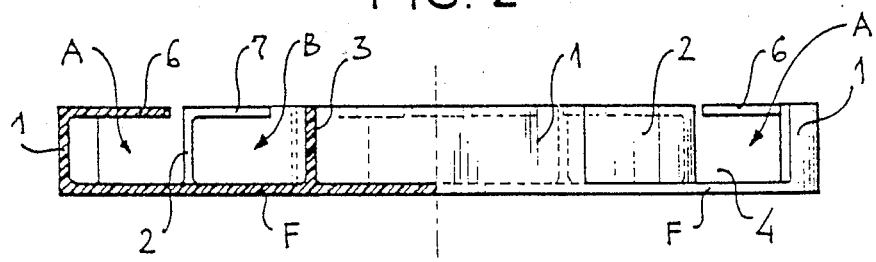
FIG. 2 is a side view, in partial section, of the Figure 1 support.

The support shown in FIGS. 1 and 2 is in the form of a cylindrical spool obtained by molding a plastic material. The support comprises: an outer wall 1 which is cylindrical in shape and which has wide openings 4; an inner wall 2 having wide openings 5; and a central cylinder 3. The outer and inner walls and the central cylinder are integrally molded together with a base F. A circular outer ring A is delimited between the outer wall 1 and the inner wall 2, and a circular inner ring B is delimited between the inner wall 2 and the central cylinder 3. The openings 4 through the outer wall 1 are situated opposite solid portions of the inner wall 2, and likewise the openings 5 through the inner wall 2 are situated opposite solid portions of the outer wall 1. Lugs 6 are inwardly directed towards the center 0 of the support from the top of the outer wall 1, and similarly lugs 7 are inwardly directed towards the center 0 of the support from the top of the inner wall 2. Lugs 8 are outwardly directed towards the inner wall 2 from the top of the central cylinder 3, with each lug 8 being situated between a pair of lugs 7 on the inner wall 2, and preferably being equidistant therebetween. The base F of the support includes pairs of holes 9 close to each opening 5 through the inner wall 2 and pairs of holes 10 through the outer ring 1A.

The outer ring A serves to store slack lengths of fiber-carriers and the inner ring B serves to store slack lengths of optical fiber from the fiber-carriers. Connection devices such as 11 for interconnecting pairs of optical fibers are also housed in the inner ring B.

The FIG. 1 support is placed vertically in a connection box, together with identical supports placed side-by-side, with the supports being used for interconnecting fiber-carriers from cables which are terminated at said box.

FIG. 1 shows two cable-carriers J1 and J2 by way of example. Since there are only two fiber-carriers, they should carry the same number of fibers each, and they enter the support in opposite directions. Other configurations are naturally possible, for example a single fiber-carrier with ten optical fibers could enter the support from one side and two fiber-carriers having five optical fibers each could enter the support from the other side, and more generally, a first plurality of fiber-carriers may enter the support from one side conveying optical fibers for connection to optical fibers conveyed to the other side of the support by a second plurality of fiber-carriers.

A slack length of fiber-carrier exists between the point where the fiber-carriers are separated from one another where the cables enter the connection box, and the ends of the fiber-carriers which are fixed to the supports. The slack lengths may be two meters long, for example. Similarly, the optical fibers extend beyond the ends of their fiber carriers by respective slack lengths which may be several tens of centimeters long. The end of each fiber-carrier is fixed to its support by means of the pairs of holes 9 and 10. After the fibers have been interconnected by a connection device 11, which may be of any known individual or multiple type, the optical fibers and the connection devices are disposed in the inner ring B around the central cylinder 3. Thereafter the fiber-carriers are wound round the outer ring until the support can be placed in the connection box. When any subsequent action is required on the fibers and/or their connection devices, the support is removed from its position in the connection box, and then the fiber-carriers are unwound from the outer ring thereby enabling the support to be removed from the connection box by virtue of the slack given by the slack lengths of fiber-carrier after they have been unwound therefrom.

Figure 3:
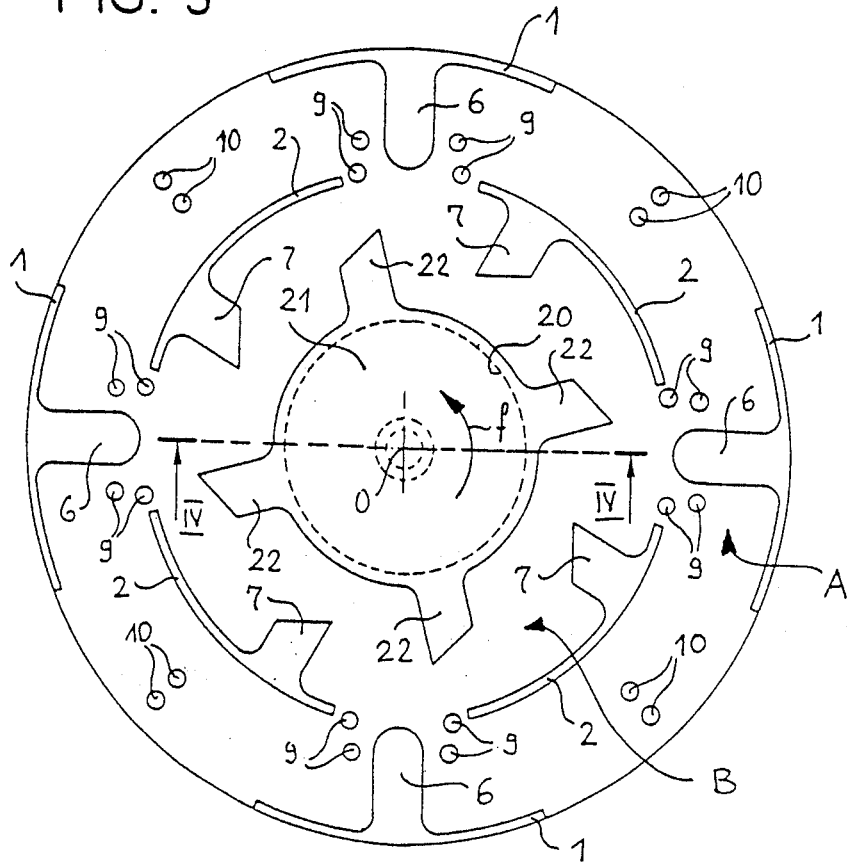
FIG. 3 is a plan view of a variant of the FIG. 1 support.
Figure 4:
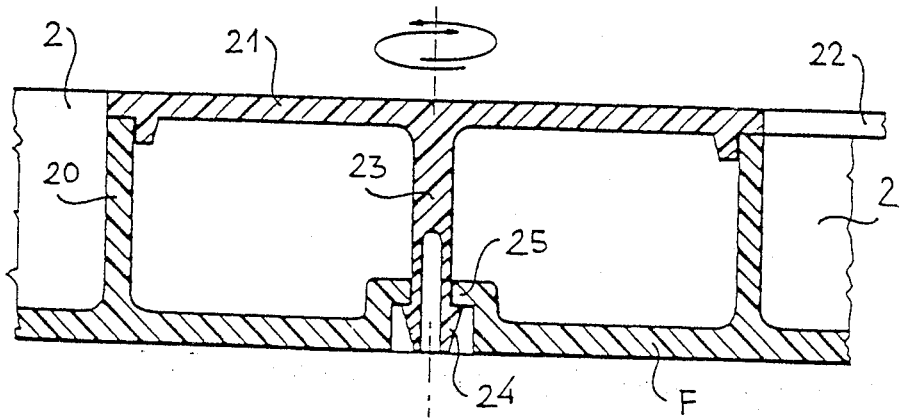
FIG. 4 is a section through the central cylinder shown in FIG. 3.

FIGS. 3 and 4 show a variant of the support shown in FIGS. 1 and 2.

In the embodiment shown in FIGS. 1 and 2, the central cylinder 3 is integrally molded with the lugs 8, whereas in the embodiment shown in FIGS. 3 and 4, the central cylinder 20 is integrally molded with the remainder to the support, but it is closed by a cover 21 on which there are lugs 22. The cover has a shaft 23 whose end 24 is snap-fitted into a bearing 25 located in the center O of the support base F and slightly offset from the plane of the base F in order to prevent the end 24 of the shaft 23 from projecting beyond said plane. The cover 21 is thus rotatable about the axis of its shaft 23, and its position shown in FIG. 3 is the position used while the optical fibers are being housed in the inner ring B. Once all the optical fibers are in place, the cover is rotated as indicated by arrow f in order to bring its lugs 22 in contact with the lugs 27 projecting from the inner wall 2. In order to ensure good contact between the lugs 7 and 22, their respective ends are chamfered. Once the lugs 7 and 22 have been brought into contact, the fiber-carriers are wound into the outer ring A and the support is put into place in the connection box. Good contact between the lugs 7 and 22 prevents the optical fibers from escaping from the inner ring B while the support is being manipulated.

Figure 5:
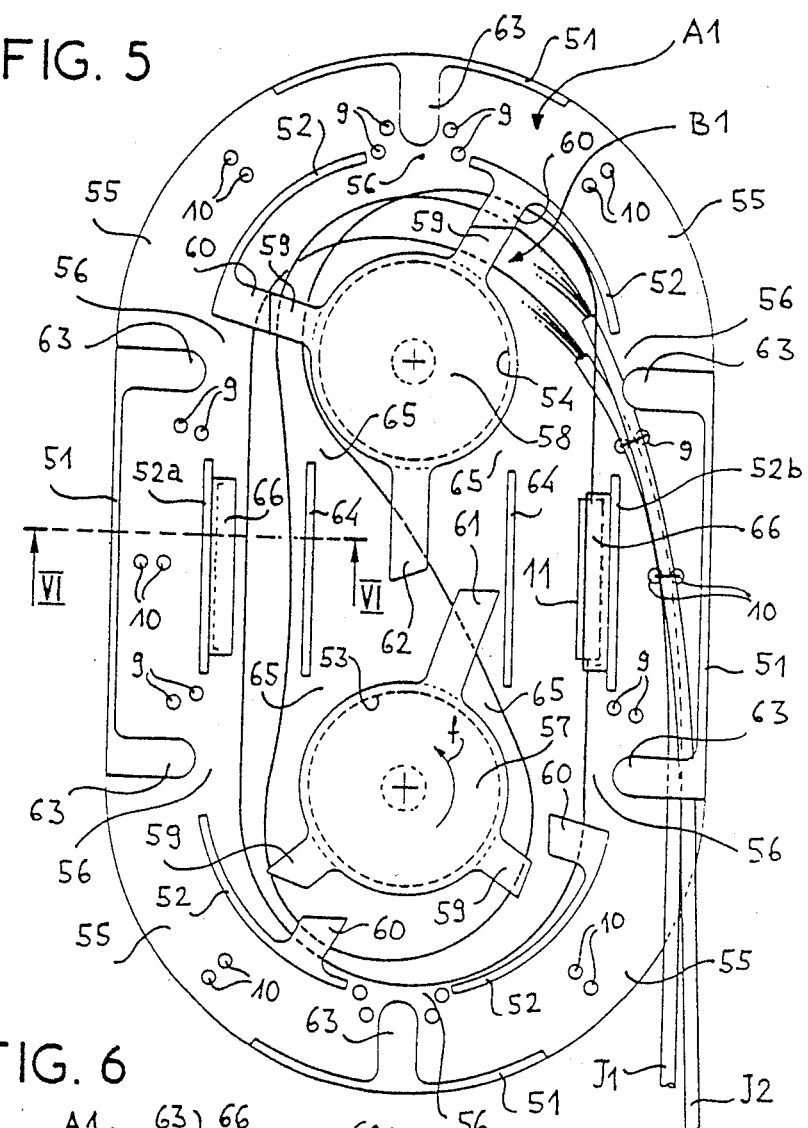
FIG. 5 is a plan view of a second variant support in accordance with the invention.
Figure 6:
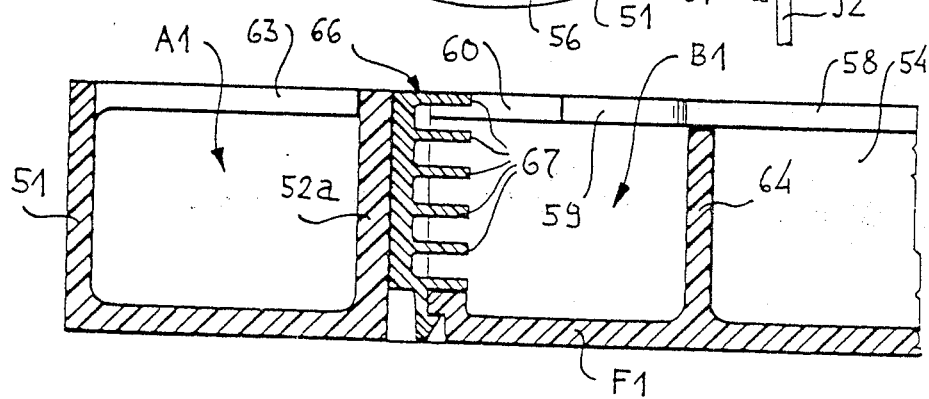
FIG. 6 is a section through a portion of the FIG. 5 support.

FIGS. 5 and 6 show a further variant of a support in accordance with the invention, which variant is in the form of an oblong spool having a base 1, an outer wall 51 having openings 55, an inner wall 52 having openings 56, first and second identical cylinders 53 and 54, each having a moving cover 57 and 58 with lugs 59 that co-operate with lugs 60 which are fixed to the inner wall 52, and a single long lug 61, 62 for co-operating with the corresponding lug 62, 61 from the other cylinder. The lubs on the inner wall and the lugs on the covers have chamfered ends as for the embodiments shown in FIGS. 3 and 4. The rotatable covers 57 and 58 are of the same type as that illustrated in FIG. 4. The outer wall 51 has inwardly directed lugs 63 similar to those shown in FIGS. 1 and 3. The support further includes two longitudinal walls 64 which are parallel to each other and which extend between the two cylinders 53 and 54 over a distance equal to the diameter of the cylinders. Passages 65 are provided between each end of each of the longitudinal walls 64 and the adjacent cylinder 52 or 53 in order to pass optical fibers.

Fixing racks 66 for the optical fiber connection devices are snap-fitted in the base F1 against the rectilinear portions 52a and 52b of the inner wall where the inner wall extends between the two cylinders 53 and 54. Each rack 66 includes a comb of teeth 67 for receiving the fixing devices between adjacent pairs of teeth.

An outer, oblong ring A1 extends between the outer wall 51 and the inner wall 52, and an inner, oblong ring B1 extends between the inner wall 52 (including its rectilinear portions 52a and 52b) and the cylinders 53 and 54 together with the longitudinal walls 64. The fixing racks 66 are located inside the inner ring B1.

The support shown in FIG. 5 serves the same functions as the supports shown in FIGS. 1 and 3, i.e. it serves to interconnect the optical fibers of fiber-carriers which are fixed to the support from opposite sides and with the support being placed vertically in a connection box. However, this support may also be used to interconnect fiber-carriers which are fixed to the same side of the support. This case is illustrated in FIG. 5 where, solely by way of example, only two fiber-carriers J1 and J2 are shown both situated to the right of the figure with the winding direction of the slack lengths of optical fiber stored in the inner ring B1 being reversed. This is done, as shown in FIG. 5, by making use of the space lying between the two cylinders 53 and 54, with optical fibers passing between one of the cylinders and an adjacent longitudinal wall end, and between the other cylinder and the opposite end of the other longitudinal wall 64.

The cylinder diameter and the spacing between the cylinders are chosen to ensure that the optical fibers are not bent round a radius of curvature less than an appropriate minimum, thereby avoiding damaging the fibers when their direction of winding is reversed in the inner ring B1.

Regardless of the shape of support used (a cylindrical spool as shown in FIGS. 1 and 3 or an oblong spool as shown in FIG. 5) the connection devices 11 for interconnecting the optical fibers are housed in the inner ring and are of known type, for example they may be of the individual type with one device being provided per pair of interconnected fibers, or else they may be of the multiple type with one device being provided per pair of interconnected fiber-carriers.

When the lugs 59 of the cylinders are in contact with the lugs 60 on the inner wall because the covers 57 and 58 have been rotated, the lugs 61 and 62 on the covers are also brought into contact. It is thus possible to manipulate the oblong spool without optical fibers spilling out from the inner ring B1 or from the space extending between the two cylinders the longitudinal walls 64.

The base F1 of the oblong spool has pairs of holes 10 in the outer ring A1 and pairs of holes 9 in the immediate proximity of the openings 56 through the inner wall 52 for the purpose of fixing the fiber-carriers in exactly the same manner as for the cylindrical spool shown in FIG. 1.

Naturally the cylinders 53 and 54 need not be provided with rotating covers, in which case they should be provided with fixed lugs 59, 61 and 62. Similarly the rack 66 for fixing the optical fiber connection devices could alternatively be fixed against the longitudinal walls 64, and still lie within the inner ring B1.

I claim:

1. In an optical fiber connection support for connecting optical fibers from at least one fiber-carrier to optical fibers from at least one other fiber-carrier, and in particular for connecting the optical fibers from one fiber-carrier to the optical fibers on one or two other fiber carriers by means of connection devices, said fiber-carriers each having one end fixed to the support and each constituting a portion of a corresponding cable, said cables each having one end fixed to a connection box which includes a plurality of connection supports for the optical fibers from the fiber-carriers of the cables, the improvement wherein said support is constituted by a spool comprising; a flat base, an outer wall about the periphery of said base projecting at right angles from said base and having circumferential openings between circumferentially spaced solid outer wall portions, an inner wall projecting at right angles from said base radially inside said outer wall and having circumferential openings between circumferentially spaced solid outer wall portions, said openings within said outer wall being circumferentially offset from said openings within said inner, and at least one continuous cylinder projects at right angles to said base and interiorly of said inner wall, said inner wall together with said outer wall delimiting an outer ring, said inner wall together with said at least one cylinder delimiting an inner ring such that said outer ring serves, when said connection support is in place within a connection box, to store slack lengths of said fiber-carriers, and said inner ring serves to store slack lengths of the optical fibers together with said connection devices.

2. An optical fiber connection support according to claim 1, wherein said support spool is disposed vertically inside the connection box side-by-side with other such supports.

3. An optical fiber connection support according to claim 1, further comprising first pairs of holes within said base in the outer ring, and second pairs of holes within said base in the proximity of said openings through said inner wall for fixing said fiber-carriers.

4. A support according to claim 1, wherein the support is constituted by a cylindrical spool which includes a single central cylinder.

5. A support according to claim 1, wherein the support is constituted by an oblong spool and includes two identical cylinders at opposite ends of said oblong spool.

6. A support according to claim 5, further including two longitudinal walls situated between the cylinders and separated from each other by a distance equal to the diameter of the cylinders.

7. A support according to claim 5, further including at least one rack for fixing said optical fiber connection devices, said rack being fixed in said inner ring.

8. A support according to claim 1, wherein both the outer wall and the inner wall include inwardly directed lugs, and wherein said at least one cylinder includes outwardly directed lugs.

9. A support according to claim 8, wherein said at least one cylinder includes a rotatable cover, with said cylinder lugs being fixed to said cover.

10. A support according to claim 1, wherein said at least one cylinder is fixed.

* * * * *